(12) United States Patent
Looney et al.

(10) Patent No.: US 7,881,460 B2
(45) Date of Patent: Feb. 1, 2011

(54) CONFIGURATION OF ECHO CANCELLATION

(75) Inventors: William L Looney, Kirkland, WA (US); Anton W Krantz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1237 days.

(21) Appl. No.: 11/281,000

(22) Filed: Nov. 17, 2005

(65) Prior Publication Data

US 2007/0116254 A1    May 24, 2007

(51) Int. Cl.
    *H04M 9/08* (2006.01)
(52) U.S. Cl. ................................. 379/406.1
(58) Field of Classification Search ............... 379/406.1
    See application file for complete search history.

(56) References Cited

U.S. PATENT DOCUMENTS

| | | | |
|---|---|---|---|
| 4,578,544 A | 3/1986 | Colin de Verdiere et al. | |
| 6,181,753 B1 | 1/2001 | Takada et al. | |
| 6,580,793 B1 * | 6/2003 | Dunn et al. | 379/406.04 |
| 6,961,423 B2 * | 11/2005 | Pessoa et al. | 379/406.08 |
| 2002/0057790 A1 * | 5/2002 | Duttweiler et al. | 379/406.01 |
| 2003/0112887 A1 | 6/2003 | Sang et al. | |
| 2003/0235244 A1 * | 12/2003 | Pessoa et al. | 375/232 |
| 2004/0252826 A1 | 12/2004 | Tian et al. | |
| 2005/0152534 A1 | 7/2005 | Lipar, II et al. | |

OTHER PUBLICATIONS

International Search Report dated Mar. 30, 2007 for Application No. PCT/US2006/042505, 10 pages.

* cited by examiner

*Primary Examiner*—Alexander Jamal

(57) ABSTRACT

A determination to enable echo cancellation is made in advance of a real-time communication session. A model sample audio file stored in memory on the computer system is played through a loudspeaker connected with the computer system. The sound generated by the loudspeaker is captured by a microphone connected with the computer system to create a captured audio signal. The captured audio signal is correlated with the sample audio signal to determine the presence of any echo effect in the captured audio signal. Characteristics of any echo in the captured audio signal, for example, frequency, delay, and gain, are parameterized and stored as initial values for use by the echo cancellation algorithm. The stored parameters are used by the echo cancellation algorithm at the initiation of a communication session until the algorithm receives enough real-time information to make any necessary ongoing adjustments.

17 Claims, 7 Drawing Sheets

US 7,881,460 B2

CONFIGURATION OF ECHO CANCELLATION

BACKGROUND

Real-time communication using network-connected computing devices is becoming increasingly popular. This may take the form of, for example, voice over Internet protocol (VOIP) telephony, audio-enabled chat programs, and audio and video streaming. Providing the highest quality audio and/or video experience can be a differentiator among the many companies providing real-time communication audio clients.

One contributing factor to the quality of a communication experience with an audio component is the availability and effectiveness of cancellation of echo. Many software applications designed for audio communication between networked computer systems provide an echo cancellation feature. However, these echo cancellation features generally have to be manually enabled by the user. Further, there is generally a lag time before echo cancellation algorithms will effectively reduce or remove echo from the sound output in a communication session. This lag time may last half a minute or more while the sound output from a loudspeaker and captured at a microphone is compared to the audio signal input to the speaker and any echo effects are removed. Thus, even when echo cancellation is enabled, a user may still have a poor experience during an initial period of the communication session.

The information included in this Background section of the specification is included for technical reference purposes and is not to be regarded subject matter by which the scope of the invention is to be bound.

SUMMARY

The technology described and claimed herein is directed to detecting whether echo cancellation is required for a particular audio device configuration in advance of a real-time communication session or other audio communication. If it is determined that echo cancellation is required, a set of stored parameters corresponding to the audio device configuration may be used by an echo cancellation algorithm at the initiation of a communication session until the algorithm receives enough audio information to make any necessary ongoing adjustments. When configuring devices for conducting real-time audio communications or other audio communication with the computer system, a model sample audio file stored in memory on the computer system is played through a loudspeaker output device connected with the computer system. The sound generated thereby is captured and transduced by a microphone input device connected with the computer system to create a captured audio signal, which is digitized for processing by the input device or the computer system. The captured audio signal is correlated with the sample audio signal to determine the presence of any echo effect in the captured audio signal. Characteristics of any echo in the captured audio signal, for example, frequency, delay, and gain, are parameterized and stored as initial values for use by the echo cancellation algorithm.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In some implementations, articles of manufacture are provided as computer program products. One implementation of a computer program product provides a computer program storage medium encoding a computer program readable by a computer system. Another implementation of a computer program product may be provided in a computer data signal embodied in a carrier wave by a computer system and encoding the computer program. Other features, details, utilities, and advantages of the claimed subject matter will be apparent from the following more particular written Detailed Description of various embodiments and implementations as further illustrated in the accompanying drawings and defined in the appended claims.

DETAILED DESCRIPTIONS

An implementation of the technology described herein provides for the automatic enablement and configuration of echo cancellation in a software application operating on a computer system. This technology aids a user of the computer system conducting audio communication sessions to easily identify and more quickly alleviate echo effects in sound output caused by the audio devices used to conduct such sessions.

Figure 1:
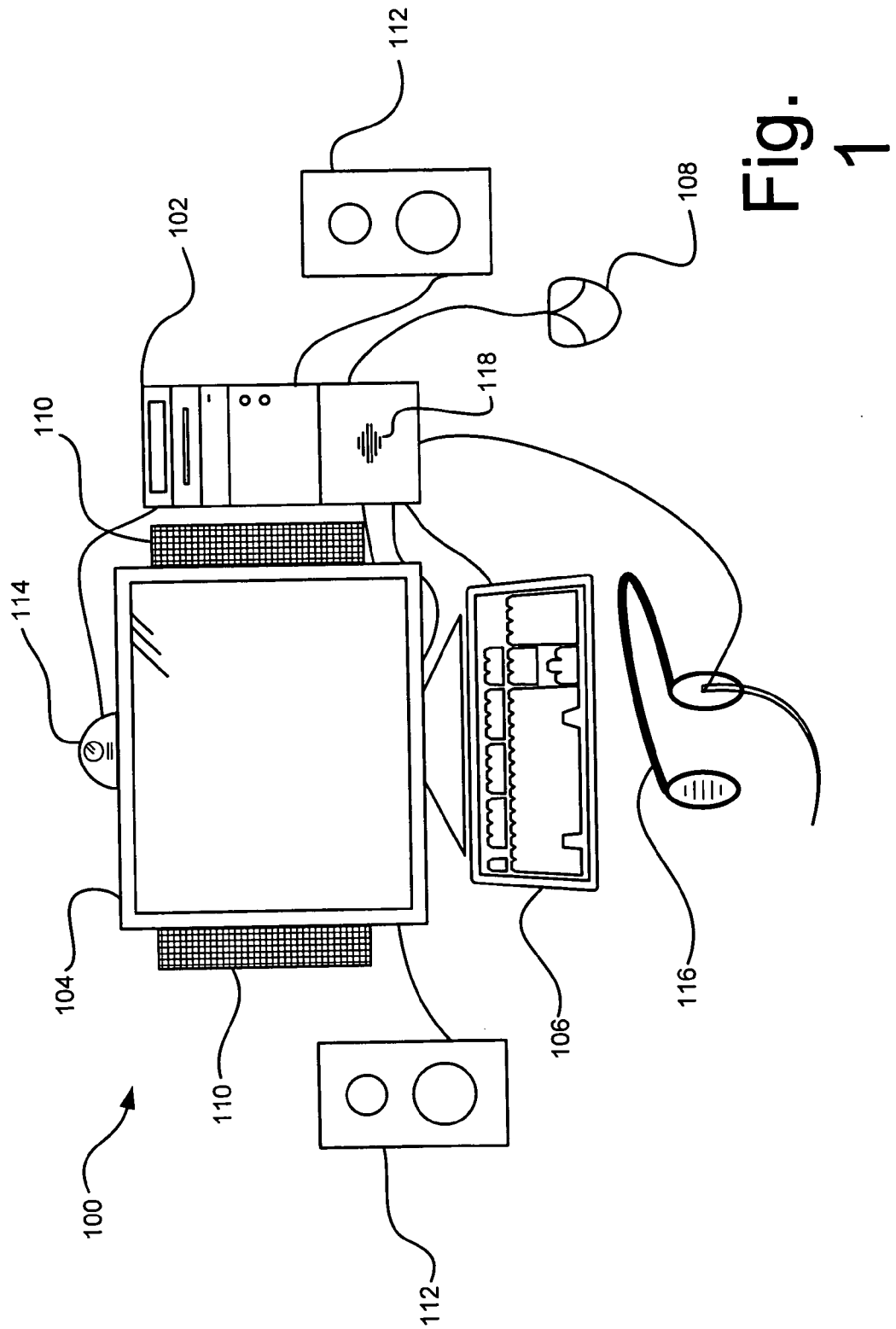
FIG. 1 depicts an exemplary personal computer system with a plurality of attached audio devices.

For example, when conducting an audio conference, e.g., a VOIP telephone call using a personal computer system, both an audio input device, e.g., a microphone, and an audio rendering device, e.g., one or more loudspeakers, are necessary to conduct a communication session. As depicted in FIG. 1, a personal computer system 100 may be equipped with a variety of peripheral devices that may include audio functionality. A typical personal computer system 100 may include a computer 102 and a video monitor 104, a keyboard 106, and a mouse 108 connected to the computer 102. The computer 102 may have a built-in loudspeaker 118 for producing sound. The video monitor 104 may also be equipped with a pair of loudspeakers 110. Further, the user of the personal computer system 100 may also attach a set of external loudspeakers 112 to the computer 102. The personal computer system 100 may also include a combination video camera and microphone 114 for conducting Internet video conferences. The user may also attach a headset 116 that combines earphone loudspeakers and a microphone for participating in VOIP or Internet video conferences.

The sound output from a loudspeaker is often captured by a microphone. The input signal from the microphone including the sound output is slightly delayed in time from the original audio signal corresponding to the sound output. Therefore, captured sound from the microphone transmitted to the source of the original audio signal and output on a loudspeaker at the source location may create an echo effect that is annoying to the party at the source location. Echo cancellation algorithms are thus provided to remove remnants of the original audio signal in the captured signal before output of the captured signal. The systems and methods described herein function as an automatic aid to a user of the computer system to determine the need for echo cancellation, enable echo cancellation if necessary, and provide initial parameters at the instantiation of the echo cancellation algorithm.

In an exemplary instance, a computer system with a connected microphone and loudspeaker configuration is tested to determine whether there is a need for an echo cancellation algorithm in conjunction with an audio-client implementing a real-time communication session. If so, automatic enablement of the echo cancellation algorithm is effected. In order to determine whether echo cancellation is necessary for the particular audio configuration, a sample audio file stored in memory associated with the computer system may be output through a loudspeaker connected with the computer system. The sample audio file is transformed into an analog signal and transmitted to the loudspeaker. The loudspeaker transduces the analog audio signal to acoustic energy to create sound waves in the atmosphere.

Any sound waves, including sound corresponding to the sample audio file, are picked up by the microphone and transduced into an analog audio signal. Sounds received by the microphone during the same time period that the sample audio file is played by the loudspeaker are recorded. The analog audio signal is transformed by the microphone or the computer system into a digital data format. In one implementation, the captured audio data from the microphone and the sample audio file are converted into a common data format if necessary. The audio data from the captured sounds is compared with the audio data from the known sample audio file to determine whether there is a correlation between the audio data indicating the presence of an echo signal.

If there is an echo correlation, the echo cancellation algorithm is activated to compare the captured audio data and the sample audio data and calculate a set of initial parameters for use upon future instantiations of the audio-client. When a communication session begins, the echo cancellation algorithm processes the captured audio signal using the stored initial parameters. If there is an insignificant correlation, the computer system may determine that the use of the echo cancellation algorithm with the particular audio device configuration is unnecessary and an inefficient use of processing resources. In this event, the echo cancellation algorithm may be disabled.

Figure 2:
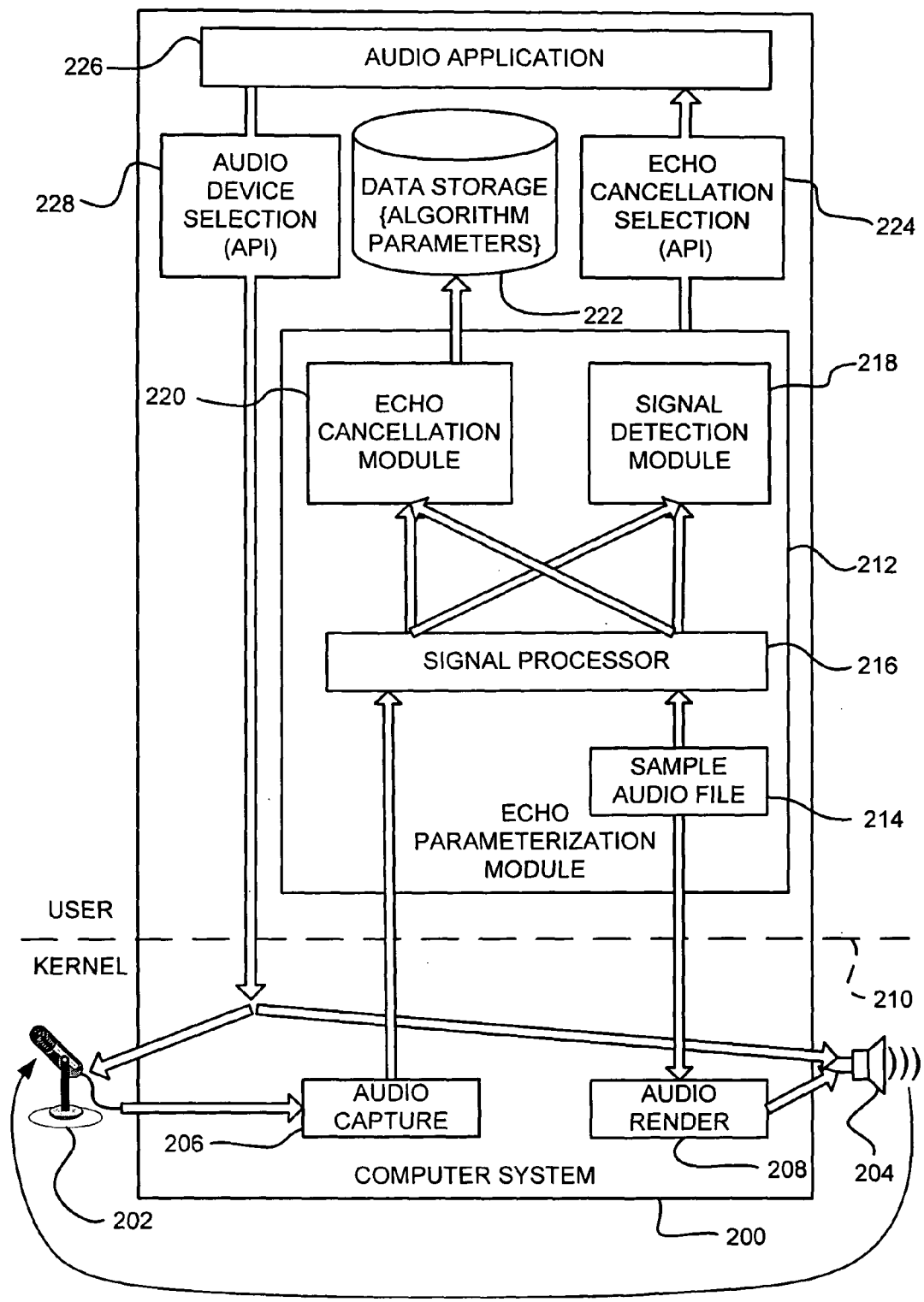
FIG. 2 illustrates exemplary modules in a computer system for detecting an echo effect and defining echo cancellation parameters.

An exemplary computer system 200 with components and modules for implementing the echo cancellation activation technology is depicted in FIG. 2. Two exemplary peripheral devices, a microphone 202 and a loudspeaker 204, are connected with the computer system 200. The microphone 202 may be a hardware device internal to the computer system 200 or it may be an external device connected to the computer system 200 via a wired or wireless connection. Similarly, the loudspeaker 204 may be a hardware device internal to the computer system 200 or it may be an external device connected to the computer system 200 via a wired or wireless connection. The loudspeaker 204 may be a single speaker, a pair of speakers, or it may be a system of a plurality of speakers, for example, in a "surround sound" configuration.

Alternatively, the microphone 202 and loudspeaker 204 may be combined in a single device, for example, a telephone handset or a headset. The microphone 202 is connected to the computer system 200 as an input device to an audio capture module 206. The loudspeaker 204 is connected to the computer system 200 as an output device to an audio rendering module 208.

As shown by the arrow from the loudspeaker 204 to the microphone 202, sound emitted by the loudspeaker 204 may be picked up by the microphone 202. This is a source of echo effects.

As shown in FIG. 2, the automatic echo cancellation determination functionality may be implemented with resources in both the kernel and the user-mode of the computer system 200 as indicated by the dashed line 210. In other operating systems and computing environments, such components and modules may be controlled at other levels of the software architecture. In this exemplary embodiment, the kernel manages the machine's hardware resources, including the processor and the memory, and low-level hardware interfaces, and controls the way other software components, for example, user-mode components, can access these resources, for example, through device drivers, memory management routines, the scheduler, and system calls.

The audio capture module 206 and the audio render module 208 may both reside in the kernel. The audio capture module 206 converts analog audio signals generated by the microphone 202 from sound waves into digital data signals, e.g., pulse code modulated (PCM) data, compact disc raw (CDR) data, or other common data formats, for further processing by the computer system 200. The PCM data may be of various qualities, for example, PCM 16, PCM 32, or PCM 48. The audio rendering module 208 converts digital audio files, for example, in waveform audio format (WAV), MPEG1, digital sound module (DSM) audio format, or other common data formats, into analog audio signals for acoustic rendering by the loudspeaker 204. In other forms, each or both of the loudspeaker 014 and the microphone 202 could be a digital loudspeaker or a digital microphone, wherein the audio rendering function of digital to analog transformation and audio capturing function of analog to digital transformation occurs in the loudspeaker and microphone themselves, respectively. Thus, in such forms, the audio rendering module 208 and audio capture module 206 need not reside in the kernel.

Additional functionality is implemented in the user-mode, for example, as software processing routines that operate on the audio data received by the microphone 202 and the audio capture module 206, as well as other data. An echo parameterization module 212 includes a sample audio file 214, a signal processor 216, a signal detection module 218, and an echo cancellation module 220. The sample audio file 214 may be accessed by operations performed by the echo parameterization module 212 and transmitted to either or both the audio rendering module 208 and the signal processor 216. The sample audio file 214 is transmitted to the audio rendering module 208 as a known audio sample for output to the loudspeaker 204 in order to test the configuration of the loudspeaker 204 and microphone 202 to determine if an echo effect is created.

The sample audio file 214 may be a digital audio file, e.g., a WAV file or other file format, that is chosen for attributes of the sound produced. For example, the sample audio file 214 may produce a sound that includes a particular range of frequencies that are easy to detect through the microphone 202. The sample audio file 214 may additionally be chosen to generate a sound pleasing to hear by a user, for example, a musical sequence, or provide information valuable to the user, for example, configuration instructions or an advertisement. Alternatively, instead of using the sample audio file 214, a set of tones may be generated by the computer system for output at the loudspeaker in order to conduct the test for echo effect. In another instance, the sample audio file may be provided to the computer system 200 from another source over a network connected with the computer system 200. In any case, the audio data comprising the sample audio signal output by the loudspeaker 204 should be available for input into the signal detection module 218 and the echo cancellation module 220 via the signal processor 216 for comparison to the captured audio signal.

Audio signals received from the microphone 202 are also transmitted from the audio capture module 206 to the signal processor 216. Either or both of the audio signals from the audio capture module 206 and the sample audio file 214 may be processed by the signal processor 216 in order to transform the audio signals into a common data format for purposes of comparison of the audio signals. For example, if the audio signal from the audio capture module 206 is in PCM format and the audio sample file 214 is in WAV format, the audio sample file 214 may be converted by the signal processor 216 into PCM format. Alternately, the audio signal from the audio capture module 206 may be converted by the signal processor into a WAV format. In yet another instance, both the audio signal from the audio capture module 206 and the audio sample file 214 may be transformed by the signal processor 216 into a third format, e.g., audio interchange file format (AIFF) or some other data format, in the event that such a format would aid in further processing by the device detection module 212. Again, any desired file format for the audio data may be used.

Once either or both of the audio signal from the audio capture module 206 and the sample audio file 214 are processed by the signal processor 216, the captured audio signals and the sample audio file 214 are compared by the signal detection module 218. Detection of a signal processed by the signal processor 216 by directly accessing the sample audio file 214 may be desirable at one level to confirm that the sample audio file 214 is still stored within and accessible by the echo parameterization module 212 and has not been corrupted, deleted, removed, or relocated. If the sample audio file 214 were inaccessible, the test audio sounds would not be generated by the loudspeaker 204 to be detected at the microphone 202. Thus, initially, the detection of data directly from the sample audio file 214 may function as a check in the integrity of the device detection module 212 and its ability to compare the captured audio signal to a known sample audio signal.

Comparison of the audio signal from the audio capture module 206 with the audio sample file 214 may also be used to confirm that the loudspeaker 204 is in fact working and that the test is actually performed using the sample audio file 214. For example, if some ambient sound is generally picked up by the microphone 202, but the sample audio file 214 was not output at the loudspeaker 204, the echo cancellation module 218 might incorrectly conclude that there is no echo effect and no need to actuate the echo cancellation algorithm. The ability to discern whether sound transduced by the microphone 202 originated with the loudspeaker 204 may be aided by capturing and recording an audio signal from the microphone 202 during a particular window of time within which the sample audio file 214 should be played by the loudspeaker 204. Thus the signal detection module 218 compares characteristics, for example, frequency, intensity, and timing, of the data corresponding to the audio signal from the audio capture module 206 with the data from the audio sample file 214 to determine whether there is a match in the data. If the data do correlate, the signal detection module 218 confirms that the sample audio file was indeed captured by the microphone and is the basis for the echo effect test performed by the echo cancellation module 220.

In addition to the signal detection module 218, the signal processor 216 also passes the captured audio signal and the sample audio signal to the echo cancellation module 220. During the test, the echo cancellation module 220 compares and analyzes the captured audio signal and the sample audio signal to determine whether a significant echo effect is present. In some instances there may be no echo effect and thus no need to filter the captured audio signal through an echo cancellation algorithm. If there is no echo effect, such filtering would be a poor use of processing resources. For example, some headsets, telephone handsets, and speakerphones already include echo cancellation software and hardware and thus filtering through the echo cancellation module 220 of the computer system 200 would be redundant. In other instances, the environment and configuration of the audio devices may be such that no perceptible echo effect is created.

Figure 3:
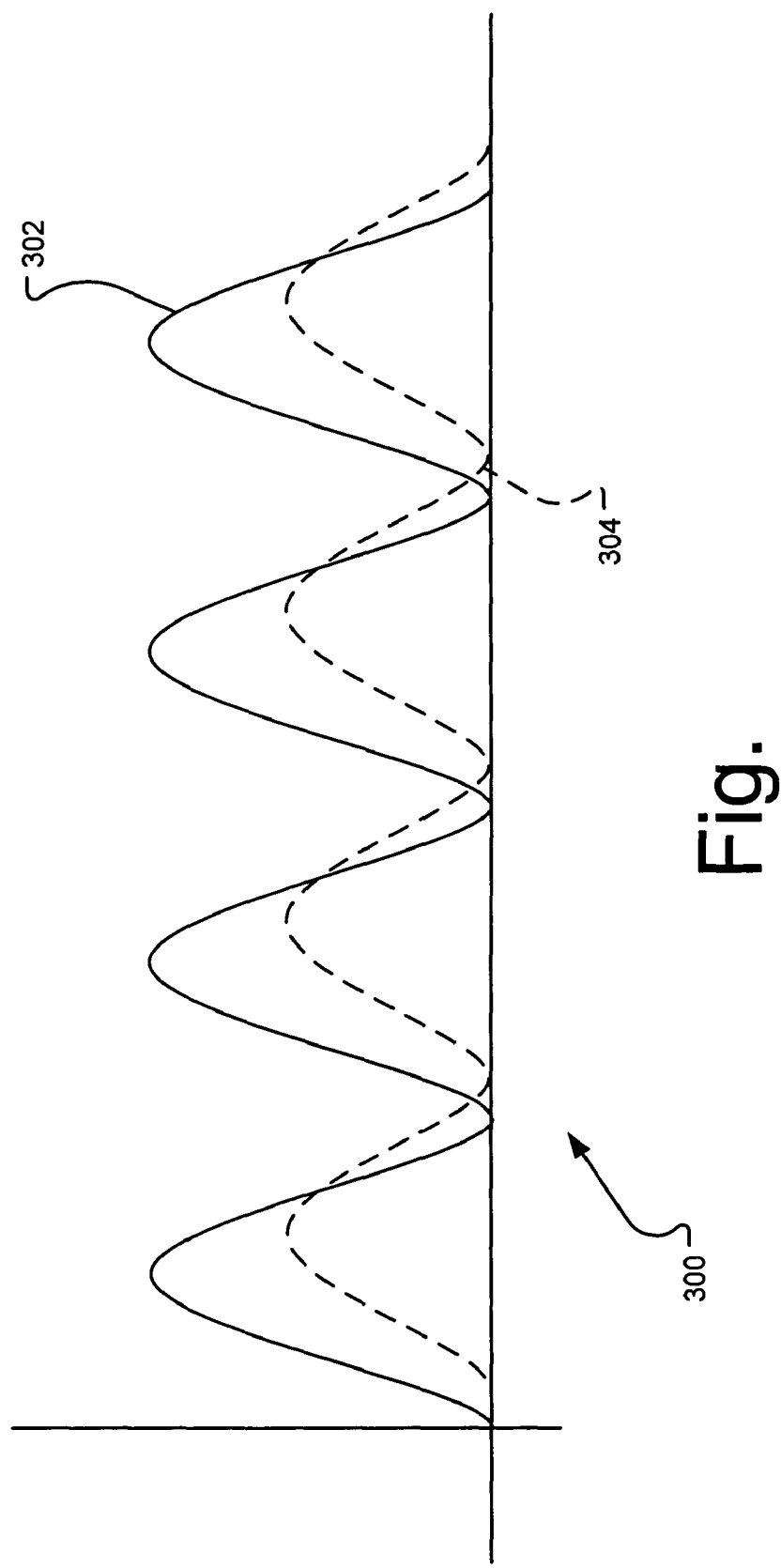
FIG. 3 illustrates an echo effect in a captured audio signal.

The significance of an echo effect is generally determined by the strength of the echo signal within the captured audio signal. An exemplary schematic of an echo effect is depicted in FIG. 3. A graph 300 plots a single frequency waveform of an original audio signal 302, or in the case of the present test scenario a sample audio signal, as a solid line and an echo signal 304 within a captured audio signal as a dashed line. The echo signal 304 is slightly delayed and follows the original audio signal 302. The amplitude of the echo signal 304 is generally less than the amplitude of the original audio signal 302, thus indicating a less powerful signal. However, the strength of the echo signal 304 may be enough to cross a threshold level determined to noticeably impact the quality of a communication session of a user and thus qualify for echo cancellation. Cancellation of the echo signal 304 is then generally performed by introducing an interference signal of corresponding frequencies but opposite amplitude to negate the effect of the echo signal.

In addition to merely determining whether there is an echo effect in the captured audio signal, the echo cancellation module 220 further uses the data from comparison of the captured audio signal with the sample audio signal to compute a set of initialization parameters to be used by the echo cancellation module 220 at the outset of an actual, real-time communication session. The echo cancellation module 220 may use several different parameters in the particular implementation of an echo cancellation algorithm, for example, estimated speaker to microphone gain statistics, estimated delay from speaker to microphone statistics, and frequency characteristics of the captured audio. Frequency characteristics may be compared by well-known Fourier transform functions or by other common methodologies.

These parameters are used to synchronize "sliding windows" in the echo cancellation module 220 between the sample audio signal played through the loudspeaker and the audio captured by the microphone. The sliding window may be understood as a continuously updated period of time and the corresponding sound played or captured during that particular period of time. The echo cancellation module 220 uses the sliding window of the output sample audio signal to determine what to cancel in the sliding window corresponding to the captured audio signal and uses the sliding window of the captured audio signal to bound the search. These sliding windows need to be synchronized in time based on the delay and reflection paths. The sizes of the sliding windows are also parameterized based on the number of echos and the variation in the delay and reflection paths to search as little of the captured audio signal stream as possible in order to reduce the number processing cycles spent by the echo cancellation module.

Once the initialization parameters are computed based upon the sample audio signal test, the initialization parameters are saved in a data storage module 222. The initialization parameters are recalled at the beginning of an actual, real-time communication session as further described below.

As shown in FIG. 2, the computer system 200 also includes an audio application 226 operating within the user-mode. The audio application 226 may be a software program instantiated by the user that will control the input and output devices, e.g., the microphone 202 and the loudspeaker 204, configured to conduct the communication session. An exemplary audio application may be a VOIP client or an audio-enabled chat program.

An "echo cancellation selection" 224 application program interface (API) acts as an interface between the echo parameterization module 212 and the audio application 226 to transfer data indicating whether the audio application 226 should enable or disable echo cancellation during a communication session based upon the results of the test by the echo cancellation module 220 with the sample audio file 214. Alternatively, the audio application 226 may provide an alert to the user through a message in a graphical user interface (GUI) (e.g., a "pop-up" window may be presented on the display monitor) to manually enable or disable echo cancellation in the audio application 226.

A second API, an audio device selection API 228 also interfaces with the audio application 226 and further with the input and output ports through which the microphone 202 and the loudspeaker 204 are connected to the computer system. (Although not depicted in FIG. 2, the audio application 226 may additionally interface with the audio rendering module 208 with a separate API to produce the sound from the communication session conducted by the audio application 226 (e.g., a VOIP telephone call) on the loudspeaker 204).

The audio device selection API 228 activates the input port or output port connected with the audio devices desired for use with the audio application 226. For example, a user's computer system 200 may have a plurality of microphones 202, for example, a first microphone integrated into a display monitor and a second microphone integrated into a web camera, and a plurality of loudspeakers 204, for example, a first set of loudspeakers wired to the computer system 200 and a second set of loudspeakers integrated into the display monitor. The audio application 226 may ask the user which microphone and set of loudspeakers the user would like to use for audio communication purposes. The audio application 226, through the audio device selection API 228, would open and close appropriate data ports to activate the desired microphone 202 and loudspeaker 204 combination.

Figure 4:
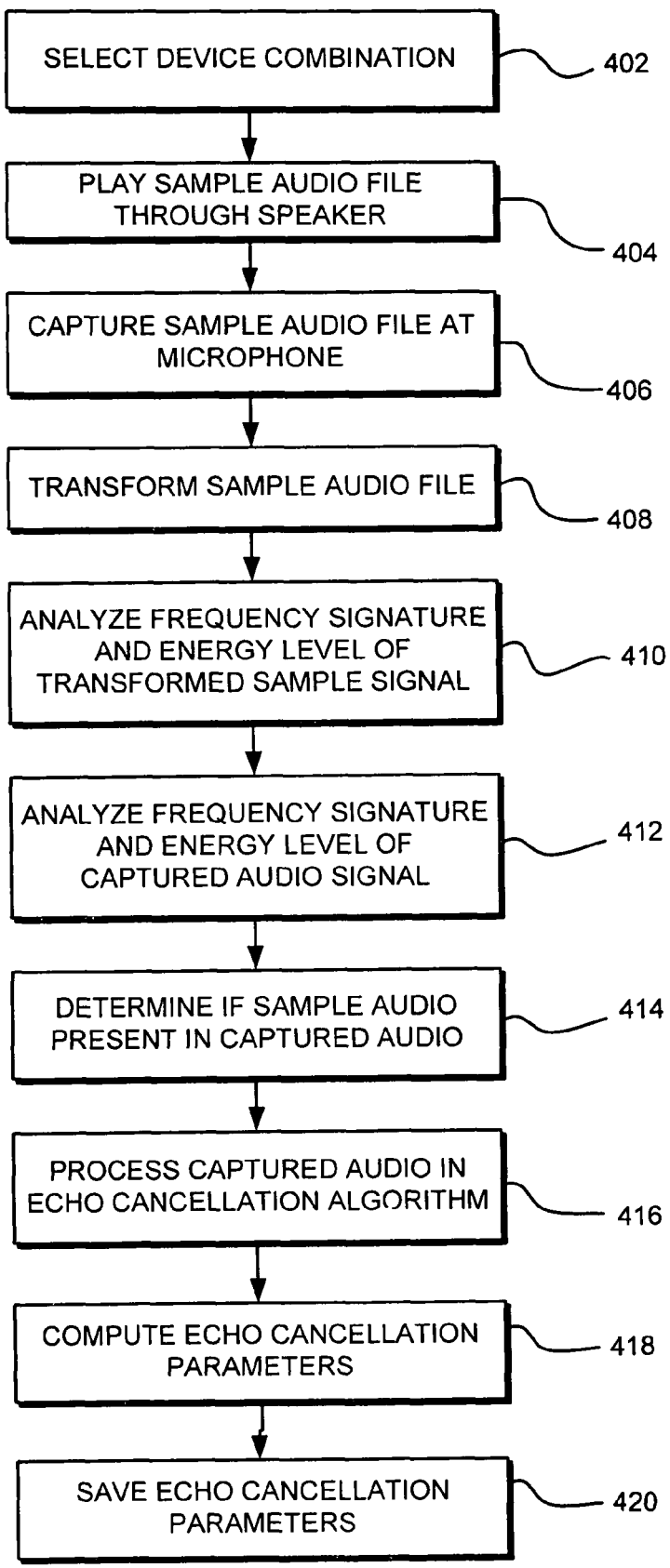
FIG. 4 illustrates a series of exemplary operations performed by the modules of FIG. 1 to detect device configuration.

An exemplary series of operations performed by a computer system to perform the automatic echo cancellation determination is depicted in FIG. 4. In the context of the exemplary configuration of the computer system of FIG. 2, the echo parameterization module is configured to detect the presence of an echo effect corresponding to the sample audio file, determine whether echo cancellation routine will be required for the particular computer system environment and peripheral audio device configuration, and compute initialization parameters for an echo cancellation algorithm. While described in the context of the computer system of FIG. 2, these and other operations described herein may be performed on systems other than the computer system of FIG. 2.

Any or all of the operations may be performed by hardware, software, firmware, or any combination thereof.

Initially, in a selection operation 402, the audio application either prompts the user to select and configure or automatically selects an audio device configuration for an audio communication session. Once the audio device configuration is determined, a play operation 408 is initiated. In the play operation 408, the sample audio file is transmitted to the audio rendering device for playback through the selected loudspeaker. Such a prompt or request may be presented through a GUI message on a display monitor. A capture operation 406 then records sound waves picked up by the microphone, including sound generated by the loudspeaker correlated to the sample audio file. The sound waves are transduced by the microphone into analog signals, which are further transformed by the audio capture module into a digital audio format.

The sample audio file is also accessed by the signal processor and transformed into a data format that can be easily compared with the format of the captured audio data in a transform operation 408. For example, if the captured audio data is in PMC format and the sample audio file is in WAV format, the sample audio file may be converted from WAV to PMC. In an alternative operation (not depicted in FIG. 4) the captured audio data may be converted by the signal processor to the format of the sample audio file. In yet another alternative operation (not depicted in FIG. 4) the data formats of both the captured audio data and the sample audio file may be converted to a third, common format.

Once the sample audio file and the captured audio data are in a common format, a first analysis operation 410 analyzes the frequency range, time signature, energy level, and any other desired characteristics of the sample audio signal corresponding to the transformed sample audio file. A second analysis operation 412 similarly analyzes the frequency range, time signature, energy level, and any other desired characteristics of the captured audio signal corresponding to the captured audio data.

A determination operation 414 then compares the characteristics of the captured audio signal with the sample audio signal to ensure that the sample audio file forms the basis for any echo effect found within the captured audio signal. The determination operation 414 may analyze windows or snapshots of the captured audio data on a continuous basis to aid in correlating the captured audio data to the sample audio data. The determination operation 414 may narrow the windows of the captured audio signal reviewed for correlation by selecting windows from a particular period of time that corresponds to the period of time during which the sample audio file was played by the loudspeaker. Reasonable correlations are thus made between the frequency range and energy level for each window of the captured audio signal and the frequency range and energy level for the sample audio signal. This may be viewed as a quality control function to further ensure that any initialization parameters computed by the echo cancellation module are based upon an analysis of the sample audio file and not ambient background noise picked up by the microphone. The audio signals need not be identical, but merely reasonably close. A threshold or range of value differences considered reasonably close may be predetermined or user-settable.

While the determination operation 414 compares the captured audio signal and the sample audio signal for content correlation, a process operation 416 processes the captured audio signal and the sample audio signal through an echo cancellation algorithm. Echo cancellation algorithms are well-known and any exemplary echo cancellation algorithm may be used in this operation. For example, most present audio communication programs for use with computer systems, e.g., MSN Messenger®, AOL® Instant Messenger, Skype™, Google® Talk, and others employ echo cancellation algorithms that may be manually enabled by the user. Echo cancellation algorithms are generally dynamic and constantly adjust or "converge" to remove echo effects that may change based upon a changing environment, e.g., different user's voices or physical locations. The process operation 416 initially makes a threshold determination of whether the echo effect, if any, is at a level significant enough to merit cancellation. If so, the process operation 416 further processes the captured audio signal and the sample audio signal through an echo cancellation algorithm to reduce or remove the echo effect.

A computation operation 418 determines a set of parameters used by the echo cancellation algorithm to cancel the echo effect corresponding to the sample audio file. The sample audio file is selected to generate sample audio signal of a length of time sufficient for an echo cancellation algorithm to compute a set of parameters that will cancel any echo effect resulting from the environment of the computer system and the configuration of the attached peripheral audio devices. The set of parameters computed by the compute operation 418 is saved to a data storage module in a save operation 420. The saved parameters are used as initialization parameters when the echo cancellation algorithm is instantiated to filter a real-time communication session hosted by the computer system.

Figure 5:
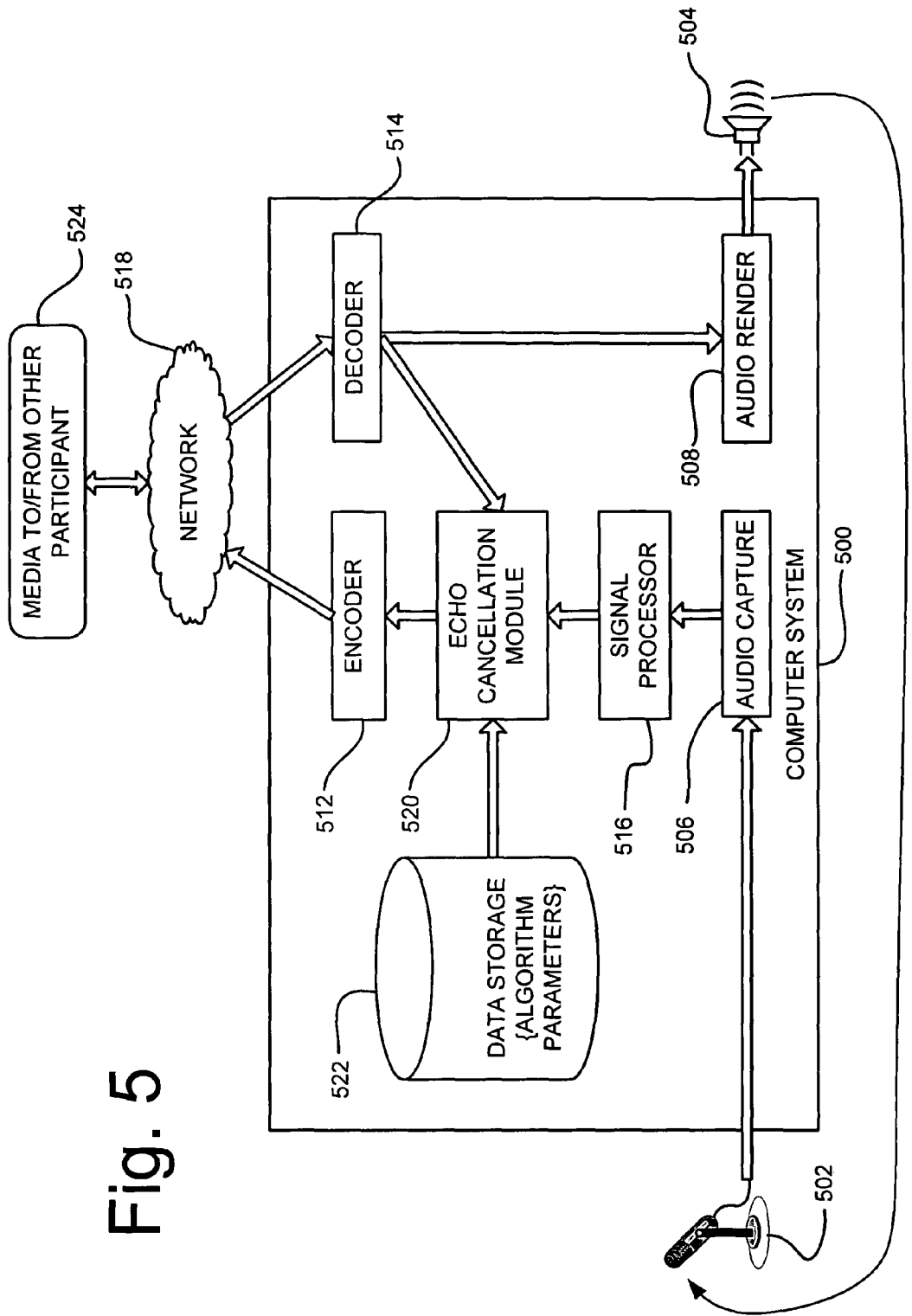
FIG. 5 illustrates exemplary modules in a computer system for initiating an echo cancellation module using stored parameters.

FIG. 5 depicts the computer system 500 configured to participate in a real-time communication session over a network 518. Before the communication session begins, the echo cancellation module 520 accesses initialization parameters from the data storage module 522. These initialization parameters are the parameters computed with respect to the sample audio file via the exemplary operations of FIG. 4. Thus, when a real-time communication session is initiated, audio signals from another participant 524 reach the user's computer system 500 via a network 518 connected with the computer system 500, the echo cancellation module 520 can immediately and effectively cancel any echo effect without any perceptible lag time by the user.

During a typical, real-time communication session, audio signals from another participant 524 may be transmitted to the computer system 500 via the network 518. Incoming audio signals are processed by a decoder 514 to demodulate and otherwise decode the incoming audio signals. The incoming audio signals are then transmitted to both the echo cancellation module 520 and the audio rendering module 508. The incoming audio signals are transformed from digital data to an analog signal by the audio rendering module 508 for output by the loudspeaker 504. The sound waves corresponding to the incoming audio signal generated by the loudspeaker 504 are picked up by the microphone 502 as indicated by the arrow from the loudspeaker 504 to the microphone 502.

The microphone 502 captures the incoming audio sound in addition to any sounds generated by the user (e.g., speech) and any environmental noise. The captured audio is transduced into an analog signal that is converted by the audio capture module 506 into a digital captured audio signal. The captured audio signal is transmitted to the signal processor 516 for conversion to a common digital data format as the incoming audio signal before being passed to the echo cancellation module 520. Alternatively, the incoming audio signal may be transmitted from the decoder 514 to the signal processor 516 while the captured audio signal could be transmitted directly from the audio capture module 506 to the echo cancellation module 520. Further, both the incoming audio signal and the captured audio signal may be processed by the signal processor 516 in to a common data form for further processing by the echo cancellation module 520.

Using the initialization parameters from the data storage module 522, the echo cancellation module 520 filters the captured audio signal to remove any echo effect corresponding to the incoming audio signal. As previously described, the echo cancellation algorithms used are dynamic and constantly monitor the captured audio signal for echo effect that may shift and change due to changes in the environment. Thus, the incoming audio signal is input to the echo cancellation module 520 as data for comparison with the captured audio signal to accommodate for shifts in the echo effect and assure continued convergence. The incoming audio signal is thus used by the echo cancellation module 520 to develop updated parameter values during the course of the communication session in much the same way that the sample audio data was used to generate the initialization parameters. However, through the use of the initialization parameters, effective echo cancellation is provided at the beginning of the communication session without any lag period in which echo effects would otherwise be present.

Once the captured audio signal is filtered, it is transmitted to an encoder module 512 for modulation and other required data conversion for transmission across the network 518 to the other participant(s) to the communication session. This process continues for the duration of the communication session. Thus, when each new communication session is initiated, the initialization parameters constructed through the test process with the sample audio file may be accessed by the echo cancellation module to provide effective, immediate echo cancellation. The initialization parameters are most effective for computer systems that do not change configurations or environments. In situations wherein a computer system often relocated to various environments, for example, a laptop computer user that travels often or a computer system that has multiple peripheral audio device options that are alternately selected by the user, the user, may run the test program in the new environment to establish new initialization parameters particular to that environment before initiating the communication session in order to take advantage of the benefit of immediate echo cancellation.

Figure 6:
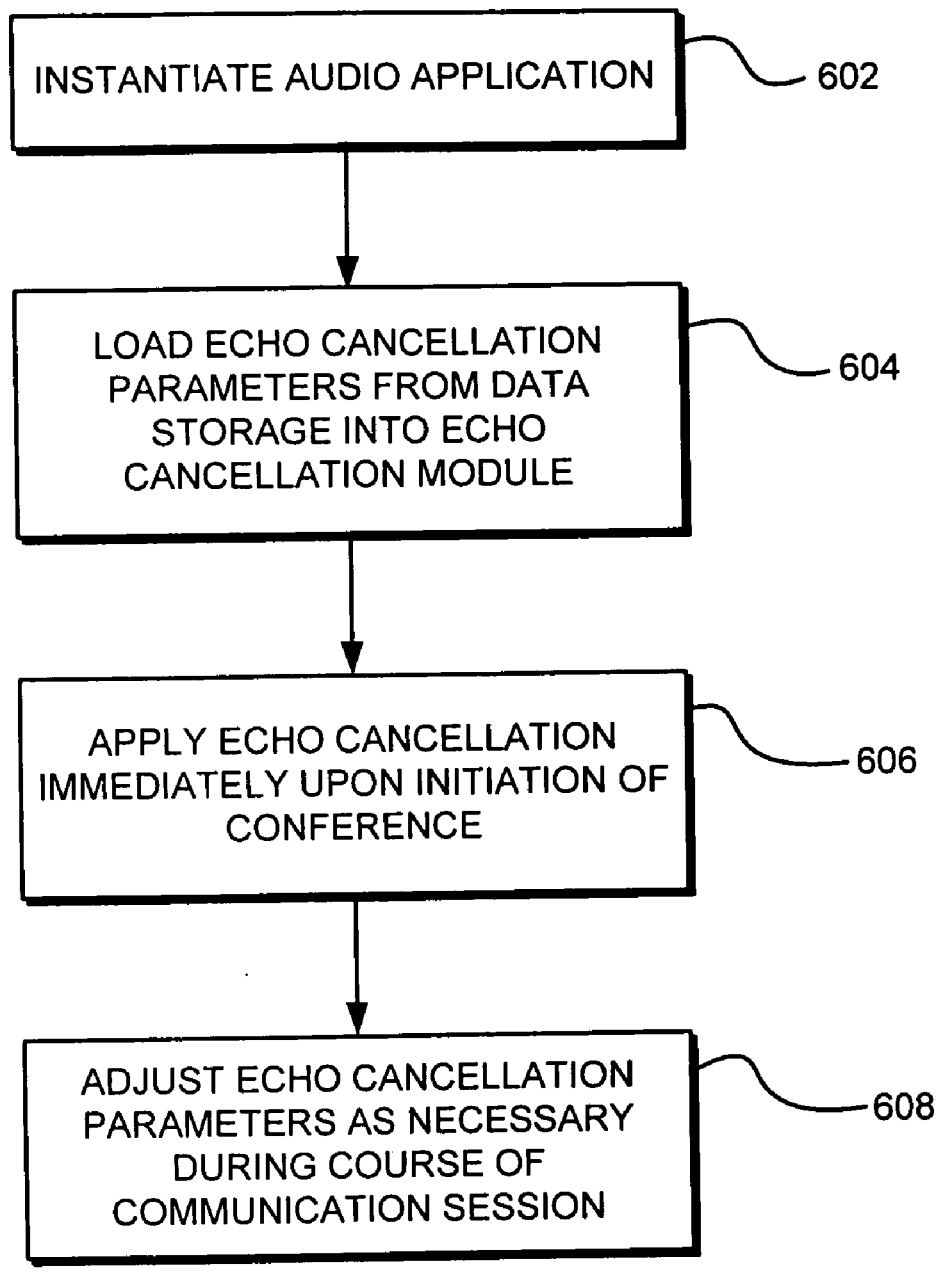
FIG. 6 illustrates another series of exemplary operations performed by the modules of FIG. 3 to initiate an echo cancellation module.

FIG. 6 depicts a series of operations performed by a computer system at the initiation of a communication session wherein initialization parameters for an echo cancellation program have been previously computed and saved. In an instantiation operation 602, an audio application is activated to conduct the real-time audio communication session on the computer system. In a loading operation 604, previously saved echo cancellation parameters are retrieved from a data storage location and entered into an echo cancellation module. In an application operation 606, the audio application enables and immediately applies echo cancellation utilizing the initialization parameters to captured audio signals. As the communication session progresses, an adjustment operation 608 adjusts the echo cancellation parameters as necessary during the course of the conference to account for variances in the incoming audio signal and changes in the environment that may affect the captured audio signal to maximize the effectiveness of the echo cancellation algorithm.

Figure 7:
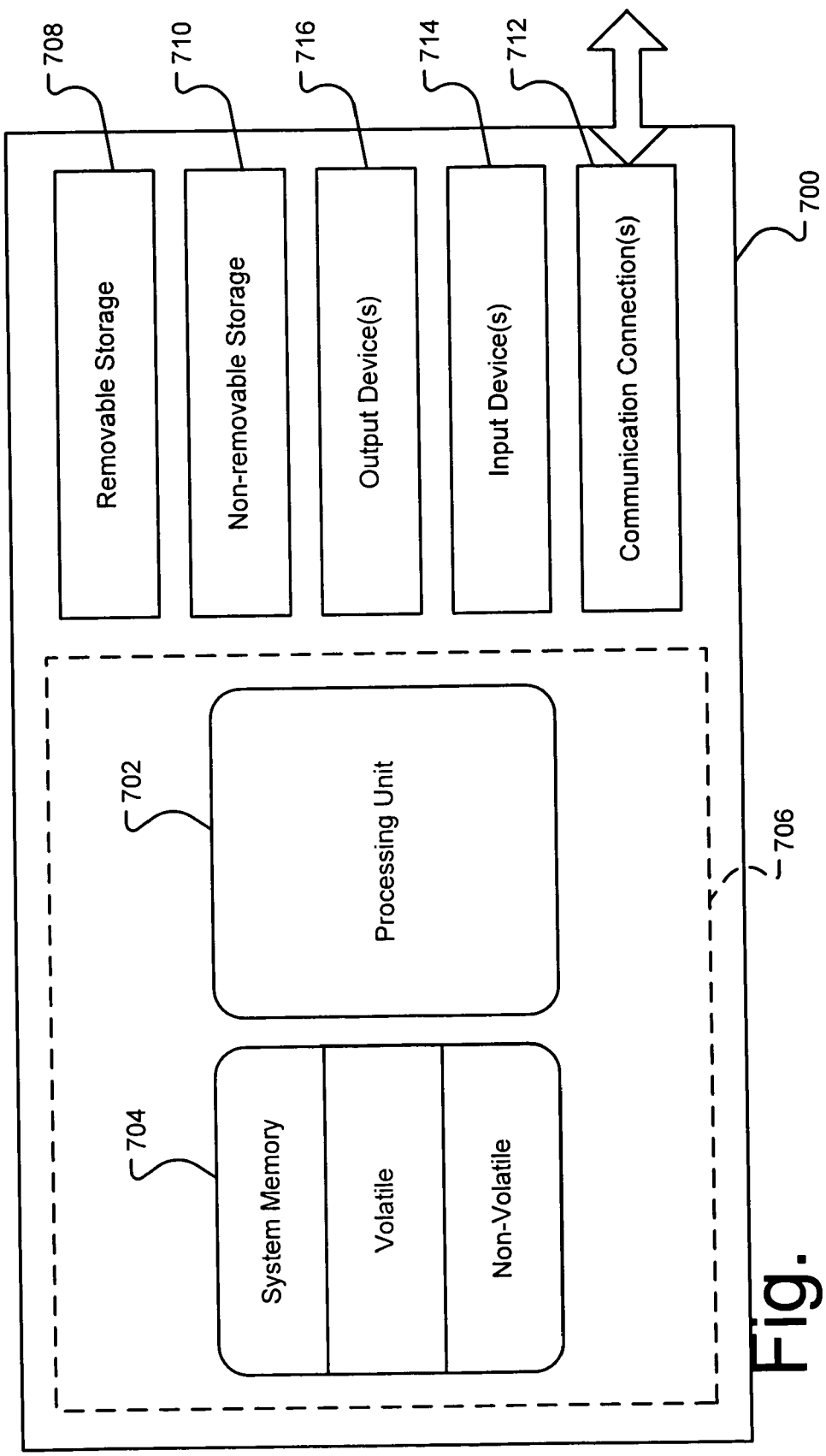
FIG. 7 illustrates an exemplary computer system for conducting real-time communication sessions and other audio input and output functions.

FIG. 7 illustrates an exemplary computer system 700 that may be used to conduct real-time communication sessions over a network and in which the detection technology described herein may operate. In one implementation, the computer system 700 may be embodied by a desktop or laptop computer, although other implementations, for example, video game consoles, set top boxes, portable gaming systems, personal digital assistants, and mobile phones may incorporate the described technology. The computer system 700 typically includes at least one processing unit 702 and memory 704. Depending upon the exact configuration and type of the computer system 700, the memory 704 may be volatile (e.g., RAM), non-volatile (e.g., ROM and flash memory), or some combination of both. The most basic configuration of the computer system 700 need include only the processing unit 702 and the memory 704 as indicated by the dashed line 706.

The computer system 700 may further include additional devices for memory storage or retrieval. These devices may be removable storage devices 708 or non-removable storage devices 710, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 702. Information may be stored on the storage media using any method or technology for storage of data, for example, computer readable instructions, data structures, and program modules.

The computer system 700 may also have one or more communication interfaces 712 that allow the system 700 to communicate with other devices. The communication interface 712 may be connected with a local area network (LAN), a wide area network (WAN), a telephony network, a cable network, the Internet, a direct wired connection, a wireless network, e.g., radio frequency, infrared, microwave, or acoustic, or other networks enabling the transfer of data between devices. Data is generally transmitted to and from the communication interface 712 over the network via a modulated data signal, e.g., a carrier wave or other transport medium. A modulated data signal is an electromagnetic signal with characteristics that can be set or changed in such a manner as to encode data within the signal.

The computer system 700 may further have a variety of input devices 714 and output devices 716. Exemplary input devices 714 may include a keyboard, a mouse, a tablet, a touch screen device, a scanner, a visual input device, and a microphone or other sound input device. Exemplary output devices 716 may include a display monitor, a printer, and speakers. Such input devices 714 and the output devices 716 may be integrated with the computer system 700 or they may be connected to the computer system 700 via wires or wirelessly, e.g., via a Bluetooth protocol. These integrated or peripheral input and output devices are generally well known and are not further discussed herein. In one implementation, program instructions implementing the methods or the modules for configuring echo cancellation, including, for example, the sample audio file, are embodied in the memory 704 and storage devices 708 and 710 and executed by processing unit 702. Other functions, for example, as performed by the audio rendering module and the audio capture module, may be performed by an operating system in the nonvolatile memory 704 of the computer system 700.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of this invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method for determining whether to apply echo cancellation in a computer system, the computer system connected with a microphone and a loudspeaker, the method comprising:

in advance of a real-time communication session:
outputting a sample sound via the loudspeaker generated from a sample audio signal;
capturing the sample sound via the microphone to produce a captured audio signal;
determining that the captured audio signal originated with the sample sound outputted by the loudspeaker generated from the sample audio signal by comparing one or more characteristics of the captured audio signal with one or more corresponding characteristics of the sample audio signal;
analyzing the captured audio signal and the sample audio signal to determine that the captured audio signal includes an echo effect associated with the sample audio signal;
automatically configuring the computer system to enable an echo cancellation algorithm;
computing one or more initialization parameters for the echo cancellation algorithm based on the analyzing, wherein the one or more initialization parameters are used for synchronizing variable sizes of sliding windows between the sample audio signal and the captured audio signal for the echo cancellation algorithm to cancel the echo effect in the captured audio signal, wherein the sizes of the sliding windows are parameterized based on at least one of a number of echoes, variation in delay, and reflection paths; and
saving the one or more initialization parameters in a memory within the computer system.

2. The method of claim 1 further comprising:
during the real-time communication session:
accessing the saved__ initialization parameters from the memory;

actuating the echo cancellation algorithm utilizing the saved initialization parameters; and filtering real-time audio signals captured via the microphone during the real-time communication session using the echo cancellation algorithm.

3. The method of claim 2 further comprising:

replacing the saved initialization parameters in the echo cancellation algorithm during the filtering operation with additional parameters dynamically developed by the echo cancellation algorithm during the real-time communication session.

4. The method of claim 1 further comprising transforming the sample audio signal and the captured audio signal into a common format.

5. A computer-readable medium having computer-executable instructions for performing a computer process implementing the method of claim 1.

6. A method for configuring an echo cancellation algorithm in a computer system, the computer system connected with a microphone and a loudspeaker, the method comprising:

in advance of a real-time communication session:

outputting a sample sound via the loudspeaker generated from a sample audio signal;

capturing the sample sound via the microphone to produce a captured audio signal;

determining that the captured audio signal originated with the sample sound outputted by the loudspeaker generated from the sample audio signal by comparing one or more characteristics of the captured audio signal with one or more corresponding characteristics of the sample audio signal; and computing one or more initialization parameters for the echo cancellation algorithm that cancels an echo effect detected in the captured audio signal and associated with the sample audio signal.

7. The method of claim 6 further comprising automatically configuring the computer system to enable the echo cancellation algorithm upon detection of the echo effect.

8. The method of claim 6 further comprising transforming the sample audio signal and the captured audio signal into a common format.

9. The method of claim 6 further comprising:

actuating the echo cancellation algorithm utilizing the initialization parameters;

and filtering additional captured audio signals via the echo cancellation algorithm.

10. The method of claim 6 further comprising saving the initialization parameters in a memory within the computer system.

11. The method of claim 10 further comprising:

accessing the initialization parameters from the memory;

actuating the echo cancellation algorithm utilizing the initialization parameters;

and filtering additional captured audio signals via the echo cancellation algorithm.

12. The method of claim 11 further comprising:

replacing the initialization parameters in the echo cancellation algorithm during the filtering operation with additional parameters dynamically developed by the echo cancellation algorithm.

13. A computer-readable medium having computer-executable instructions for performing a computer process implementing the method of claim 6.

14. A computer system that configures an echo cancellation algorithm, the computer system comprising:

a processor;

a memory accessible by the processor and having a sample audio file embodying a sample audio signal;

a loudspeaker under control of the processor and capable of outputting a sample sound corresponding to the sample audio signal;

a microphone under control of the processor and capable of receiving a captured sound, including the sample sound, and producing a corresponding captured audio signal;

a signal detection module under control of the processor and capable of determining whether the captured audio signal originated with the sample sound outputted by the loudspeaker corresponding to the sample audio signal by comparing one or more characteristics of the captured audio signal with one or more corresponding characteristics of the sample audio signal; and an echo cancellation module that computes one or more initialization parameters for the echo cancellation algorithm that cancels an echo effect found in the captured audio signal and associated with the sample audio signal.

15. The computer system of claim 14, wherein the signal detection module is capable of receiving both the sample audio signal and the captured audio signal and is adapted to compare the sample audio signal to the captured signal to determine whether the captured audio signal includes an echo effect associated with the sample audio signal.

16. The computer system of claim 14, wherein the memory further stores the initialization parameters.

17. The computer system of claim 16, wherein the processor further:

accesses the initialization parameters from the memory;

actuates the echo cancellation algorithm utilizing the initialization parameters; and filters additional captured audio signals via the echo cancellation algorithm.

* * * * *